April 4, 1950  A. S. IRWIN  2,502,523
ROTARY DAMPENER

Filed Oct. 23, 1945  3 Sheets-Sheet 1

INVENTOR
ARTHUR S. IRWIN
BY
Bean, Brooks, Buckley & Bean.
ATTORNEYS

April 4, 1950  A. S. IRWIN  2,502,523
ROTARY DAMPENER
Filed Oct. 23, 1945  3 Sheets-Sheet 2

INVENTOR
ARTHUR S. IRWIN
BY
Beam, Brooks, Buckley & Beam. ATTORNEYS

April 4, 1950     A. S. IRWIN     2,502,523
ROTARY DAMPENER

Filed Oct. 23, 1945     3 Sheets-Sheet 3

INVENTOR
ARTHUR S. IRWIN

Patented Apr. 4, 1950

2,502,523

UNITED STATES PATENT OFFICE 2,502,523

ROTARY DAMPENER

Arthur S. Irwin, Clarence, N. Y., assignor to Bell Aircraft Corporation, Wheatfield, N. Y.

Application October 23, 1945, Serial No. 623,961

3 Claims. (Cl. 188—92)

This invention relates to improvements in hydraulic devices for regulating rapidity of movement and particularly oscillations of members such as vehicle wheels about steering axes thereof, and the like. More specifically, an object of the invention is to provide an improved anti-shimmy device for controlling rotations of a spindle carrying a steerable or castering ground contacting wheel. Another object of the invention is to provide an improved hydraulic anti-shimmy device for the purpose described which is adapted to permit rotation of the wheel spindle through 360° or more while exerting anti-shimmy control at any stage of the spindle rotation. Another object of the invention is to provide a device of the character aforesaid which also incorporates in improved manner a temperature change responsive means for automatically adjusting the anti-shimmy device to procure optimum results under different temperature conditions. Another object of the invention is to provide an anti-shimmy device of the character aforesaid which is of improved structural simplicity and ruggedness and adapted to be manufactured inexpensively by employment of only standard shop practices. Other objects and advantages of the invention will appear in the specification hereinafter.

Figure 1:
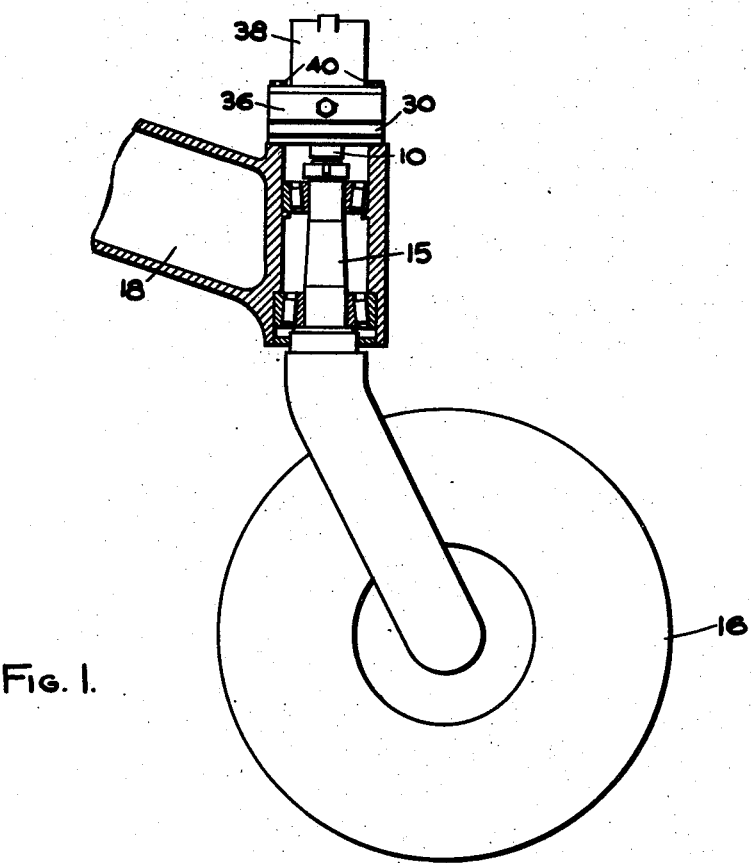
Fig. 1 shows an anti-shimmy device of the invention in operative connection with a vehicle wheel such as an airplane landing wheel.

The invention is illustrated in the drawing in connection with a castering wheel of an airplane or the like, but it will be understood that the invention is not limited to any particular application and may be employed in conjunction with any oscillatable member for damping the movements thereof so as to eliminate undesirable shimmying. The damping control device of the invention is illustrated herein to comprise a housing 10 which carries a bushing 12 within which is journaled a shaft 14. At its outer end the shaft 14 is adapted to be coupled by any suitable connection means to the movable member to be controlled such as the spindle 15 which carries the ground wheel 16 (Fig. 1). The housing 10 is adapted to be rigidly connected to the frame structure of the vehicle such as to the member 18; and a fluid seal is preferably employed as at 20 to reduce possibility of oil leakage from the unit around the shaft 14.

Figure 6:
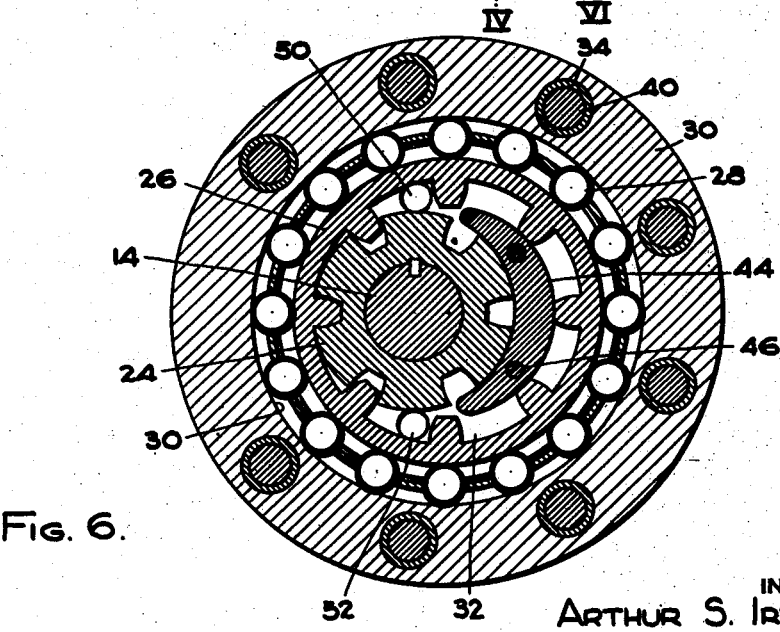
Fig. 6 is a section as along line VI—VI of Fig. 2.
Figure 3:
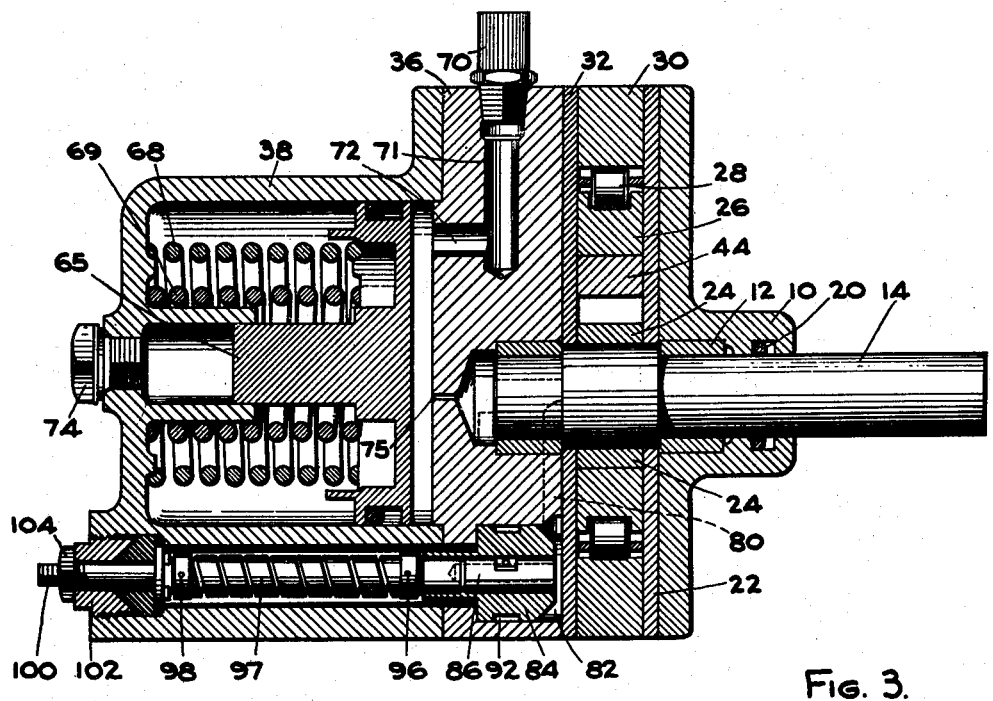
Fig. 3 is a view similar to Fig. 2, but transversely thereof.

The housing 10 mounts an accurately machined bearing plate 22 which fits upon the shaft 14, and a gear 24 is keyed to the shaft to rotate therewith in sliding relation against one side of the bearing plate 22. As shown in Fig. 6, the shaft 14 is disposed eccentrically to the housing and the bearing plate so as to position the gear 24 to operatively mesh with an internal gear 26 which is disposed concentrically to the housing unit while being rotatably carried thereon by a roller bearing unit 28 which runs interiorly of a race ring 30. A second bearing plate 32 and the race 30 and the bearing plate 22 are mutually aligned and maintained in accurately aligned relation by a plurality of sleeves 34 which are inserted through registering apertured portions of the members 30—32—34. A valve block 36 of circular form is mounted adjacent the outer face of the bearing plate 32, and a fluid chamber cover member 38 is positioned against the outer face of the valve block 36. Bolts 40 are extended through registering apertured portions of the housing 10; the sleeves 34; the valve block 36; and the cover 38 to maintain these members in rigidly assembled relation.

A crescent shaped partition block 44 (Fig. 6) is disposed within the space between the inner and outer gears 24—26 and is fixed to the bearing plate 22 as by pins 46. The partition block 44 is so dimensioned as to provide slide bearing surfaces for the ends of the teeth of the gears 24—26 when rotating relative to the casing. The bearing place 32 is ported at 50—52 at diametrically opposed positions thereon adjacent the periphery of the gear 24, and the valve body 36 is chambered as at 54—56 (Figs. 4-5) in registry with the ports 50—52. The valve chambers 54—56 are fitted with check valve devices 58—59 controlling corresponding fluid channels 60—61 (Figs. 2-5) extending through raised portions 62—62 of the valve body member.

The cover 38 provides a fluid chamber housing a piston 65 which is fluid-sealed as by means of a packing 66, and compression springs indicated at 68—69 are mounted within the chamber to bias the piston toward the valve block 36. A filler plug is mounted as indicated at 70 upon the valve body whereby fresh supplies of hydraulic fluid may be fed as required through channels 71—72 (Fig. 3) into the chamber interiorly of the cover 38. Thus, it will be understood that a supply of fluid may be installed within the unit by pumping such fluid through the filler plug port against the action of the piston springs 68—69, thereby forcing the piston to retreat to fill the chamber with fluid maintained at predetermined pressure against the face of the valve block by the action of the spring-pressed piston 65.

Figure 5:
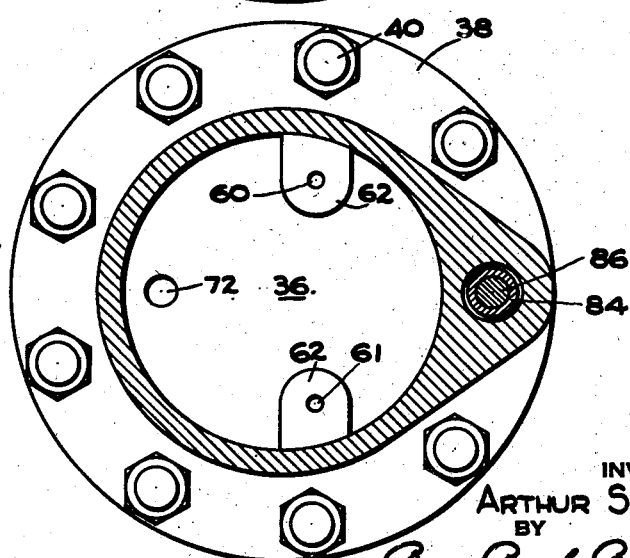
Fig. 5 is a section along line V—V of Fig. 2.
Figure 2:
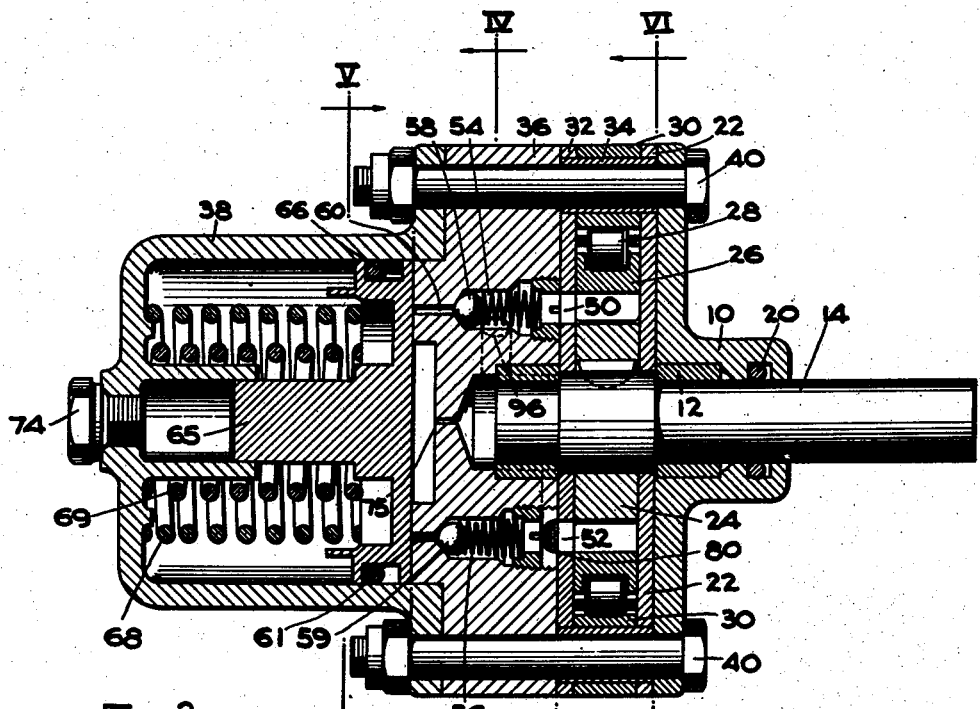
Fig. 2 is a longitudinal section on an enlarged scale through the anti-shimmy device.

A screw plug as indicated at 74 is threaded into a central end opening through the cover 38 so as to be removable to permit the operator to check the position of the piston within the reservoir. Then whenever it is noted that the piston has progressed to the right hand limit position thereof as shown in Fig. 5, the operator will be thereby advised that the reservoir requires fluid replenishment. Thus, it will be understood that a supply of fluid will be maintained under constant pressure against the ports 60—61 of the valve block for replenishing the fluid supply within the gear and valve portions of the mechanism, as may be required to compensate for losses of fluid from the mechanism due to leakages between relatively moving parts. The device will also be thereby adapted to compensate automatically for contraction of the fluid within the operative portions of the mechanism resulting from reduced temperature conditions, by providing for flow of fluid from the chamber 38 through the check valves into the gear mechanism. To accommodate expansion changes in volume of the fluid within the mechanism such as may result under increased temperature conditions an orifice 75 is provided through the valve block to lead from the outer face thereof into the bored portion thereof receiving the shaft 14. Thus, fluid expanding pressures within the gear mechanism will cause some of the fluid to squirt through the bearing devices mounting the shaft 14 and thence through the orifice 75 to return to the reservoir 38.

Figure 4:
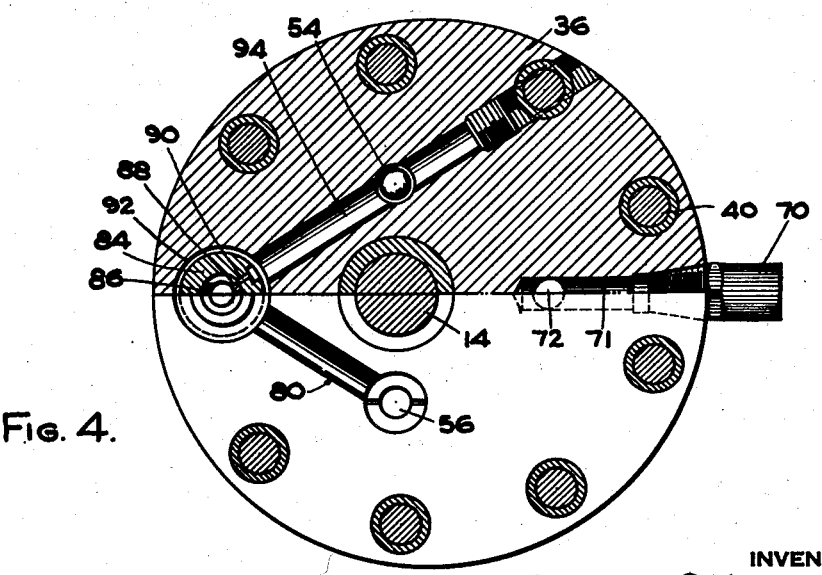
Fig. 4 is a section as along line IV—IV of Fig. 2.

To control the rate of oscillation of the shaft 14 relative to the housing 10 a fluid channel 80 is cut into the valve block 36 so as to open at one of its ends into registry with the port 52 through the bearing plate 32. As shown in Fig. 4, the channel 80 extends into open communication at its other end with a chamber 82 cut into the valve block at one side thereof. The chamber 82 houses an orifice block 84 which is centrally bored to rotatably mount therein a control sleeve 86. The upper end of the control sleeve is partially cut away so as to provide metering edge portion 88 which slidably rotates against the end of an orifice 90 extending through a side wall portion of the orifice block 84. The block 84 is peripherally grooved as indicated at 92 in registry with the orifice 90, whereby any fluid passing through the channel 80 and thence upwardly through the interior of the sleeve 86 and thence past the valving edge 88 into the orifice 90 will gain access to the channeled portion 92 of the orifice block. Thus, it will be understood that rotation of the sleeve 86 relative to the orifice block 84 will regulate the resistance to fluid flow through the orifice 90. As indicated at 94, the valve block is drilled to provide a fluid passageway which opens into communicating registry at one end with the grooved portion 92 of the orifice block and leads into open communication at its opposite end as indicated at 94 in Fig. 2 with the fluid chamber 54 of the valve block.

Thus, for example, it will be understood that rotation of the shaft 14 in such direction as to drive the gear 24 in counterclockwise direction as viewed in Fig. 6 will displace fluid trapped in the space between the gear teeth in counterclockwise direction around the partition block 44 and will force this fluid into the port 50 and thence through the channel 94 toward the metering orifice 90. As the displaced fluid moves through the orifice 90 it returns to the gear mechanism through the orifice block chamber 82 and the channel 80, thence discharging through the port 52 of Figs. 2 and 6. The adjusted position of the throttle sleeve 86 relative to the orifice 90 will regulate the resistance to such fluid flow and consequently the degree of the damping effect against the shaft 14. Similarly, clockwise rotation of the shaft 14 as viewed in Fig. 6 will displace the fluid within the gear mechanism to enter the port 52 and thence to travel through the channel 80 and the metering orifice and then to return through the channel 94 to discharge again through the port 50 into the gear mechanism; and it will be understood that the oscillation damping control forces procured by the mechanism of the invention are equally effective at all stages of rotation of the shaft 14 and irrespective of the position and direction of rotation thereof.

To provide for regulation of the orifice throttle valve 86 the latter is keyed as at 96 to one end of a helically wound bi-metal strip 97, the other end of which is keyed at 98 to an adjustment screw 100 which extends through a packing gland 102 mounted in the cover member 38. A lock nut 104 is provided on the upper end of the screw 100 for locking the latter in any position of adjustment. Thus, it will be understood that the throttle valve control device may be initially set by manual rotation of the screw 100 to such position as to dispose the throttling edge 88 of the valve 86 in proper metering position relative to the orifice 90 to obtain the desired damping operation under existing conditions. The lock nut 104 may then be turned down to fasten the valve control pin 100 relative to the housing. The bi-metallic structure of the strip 97 which interconnects the pin 100 and the throttle valve 86 is selected and designed so as to automatically procure the proper degree of twisting therein and consequent rotation of the valve 86 relative to the orifice block 84 to adjust the effective opening of the orifice 90 so as to compensate for all changing temperature conditions. For example, under rising temperature conditions such as will result in lowering of the fluid viscosity the bi-metal device 97 will operate automatically to throttle down the orifice 90, while under lowering temperature conditions the valve will be thereby automatically adjusted to further opened positions; whereby the resistance to fluid flow through the device and consequent damping operation thereof will remain substantially uniform unless adjustments of the control stem 100 are made by the operator.

I claim:

1. A hydraulic dampening device comprising a stationarily arranged casing, a work shaft rotatably mounted in said casing and attached externally to a member required to be damped, a pump rotor gear housed within said casing and rigidly attached to said shaft, said rotor gear being capable of unlimited rotation within said casing in either direction, an internal gear eccentrically arranged with respect to and surrounding said rotor gear, said internal gear being rotatably mounted within said casing and meshing with said rotor gear, a crescent-shaped partition fixedly mounted within said casing and disposed about a peripheral portion of said rotor gear and between said rotor portion and said internal gear, inlet and outlet passageways formed in said casing and in communication with the spaces between said gears at the ends of said partition, said casing being formed with a by-pass connecting said inlet and outlet passageways, control means in said by-pass for adjustably regulating the rate of flow of fluid therethrough, thermostatic means governing said control means, and a fluid reservoir adjacent said casing, means in said reservoir to normally maintain the fluid contained therein under pressure, said casing being formed with check-valved ports for connecting said reservoir with the passageways of said casing.

2. A hydraulic dampening device comprising a stationarily arranged casing, a work shaft rotatably mounted in said casing and attached externally to a member required to be damped, a pump rotor gear housed within said casing and rigidly attached to said shaft, said rotor gear being capable of unlimited rotation within said casing in either direction, an internal gear eccentrically arranged with respect to and surrounding said rotor gear, said internal gear being rotatably mounted within said casing and meshing with said rotor gear, a crescent-shaped partition fixedly mounted within said casing and disposed about a peripheral portion of said rotor gear and between said rotor portion and said internal gear, inlet and outlet passageways formed in said casing and in communication with the spaces between said gears at the ends of said partition, said casing being formed with a by-pass connecting said inlet and outlet passageways, an orifice block disposed in the by-pass, a control sleeve oscillatably mounted within said block, said block and said sleeve being formed with coacting orifices, thermostatic means for controlling the oscillation of said sleeve, and a fluid reservoir adjacent said casing, means in said reservoir to normally maintain the fluid contained therein under pressure, said casing being formed with check-valved ports for connecting said reservoir with the passageways of said casing.

3. A hydraulic dampening device comprising a stationarily arranged casing, a work shaft rotatably mounted in said casing and attached externally to a member required to be damped, a pump rotor gear housed within said casing and rigidly attached to said shaft, said rotor gear being capable of unlimited rotation within said casing in either direction, an internal gear eccentrically arranged with respect to and surrounding said rotor gear, said internal gear being rotatably mounted within said casing and meshing with said rotor gear, a crescent-shaped partition fixedly mounted within said casing and disposed about a peripheral portion of said rotor gear and between said rotor portion and said internal gear, inlet and outlet passageways formed in said casing and in communication with the spaces between said gears at the ends of said partition, said casing being formed with a by-pass connecting said inlet and outlet passageways, and control means in said by-pass for adjustably regulating the rate of fluid therethrough, a fluid reservoir adjacent said casing, means in said reservoir to normally maintain the fluid contained therein under pressure, and said casing being formed with check-valved ports for connecting said reservoir with the passageways of said casing.

ARTHUR S. IRWIN.

REFERENCES CITED

The following references are of record in the file of this patent:

UNITED STATES PATENTS

| Number | Name | Date |
|---|---|---|
| 701,118 | Wood | May 22, 1902 |
| 1,683,665 | Griffith | Sept. 11, 1928 |
| 1,828,861 | Hart | Oct. 27, 1931 |
| 2,089,418 | Peo et al. | Aug. 10, 1937 |
| 2,106,493 | Byers | Jan. 25, 1938 |
| 2,229,660 | Magrum | Jan. 28, 1941 |
| 2,281,292 | Hoover | Apr. 28, 1942 |

FOREIGN PATENTS

| Number | Country | Date |
|---|---|---|
| 560,181 | France | July 2, 1923 |